Dec. 12, 1939.  E. V. MURPHREE  2,183,148
METHOD FOR PURIFYING ACETYLENE GAS AND MANUFACTURING ACETALDEHYDE THEREWITH
Filed Nov. 25, 1931
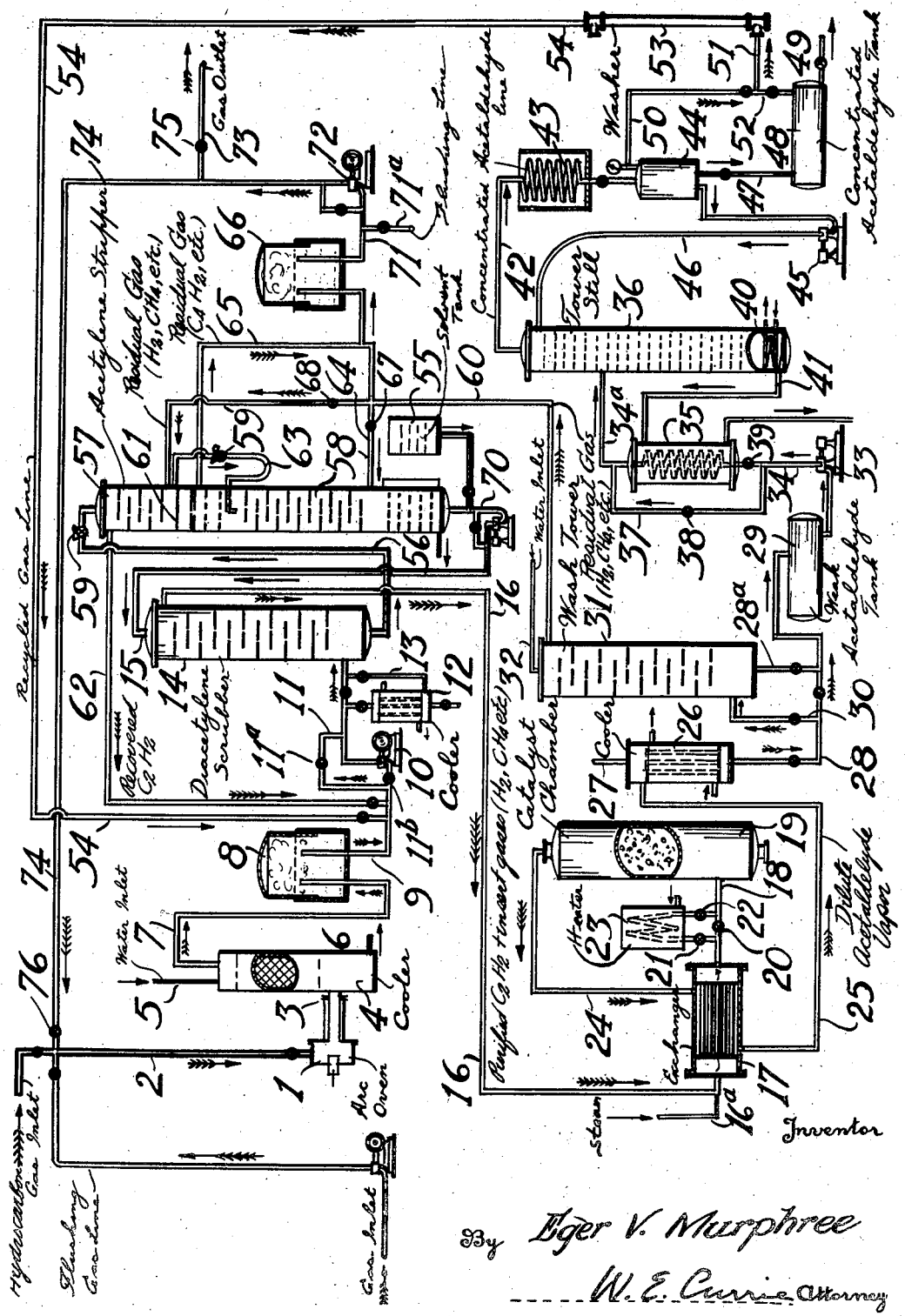
Inventor
By Eger V. Murphree
W. E. Currie Attorney Patented Dec. 12, 1939

2,183,148

UNITED STATES PATENT OFFICE

2,183,148

METHOD FOR PURIFYING ACETYLENE GAS AND MANUFACTURING ACETALDEHYDE THEREWITH

Eger V. Murphree, Baton Rouge, La., assignor to Standard Oil Development Company, a corporation of Delaware Application November 25, 1931, Serial No. 577,285

15 Claims. (Cl. 260—605)

The present invention relates to improvements in the manufacture of acetaldehyde and other organic compounds from gases containing acetylene in relatively low concentrations. Such gases are produced in electric arc processes and the like for the conversion of hydrocarbons. In the production of organic compounds from acetylene, the usual source of the latter has been calcium carbide, yielding acetylene gas in concentrated form. The process described herein makes available an abundant and cheap source of material for organic synthesis.

In accordance with this invention, the dilute gas used may vary in acetylene content between about 6% and 30%. This is prepared by any suitable arc process, various forms of which have been known for many years. The preferred source of gas for the arc process is an olefin-containing hydrocarbon, as will be described. I have found that the gases resulting from this type of process are suitable for the manufacture of acetaldehyde and the like, but that they contain impurities which must be removed before the acetaldehyde reaction takes place. Otherwise the catalyst (metallic oxides, etc.) would be quickly impaired or ruined. Among these impurities are diacetylene and other compounds which I have found to be removable by solution in oil and other solvents. It will be understood that other processes (e. g. catalytic cracking) for making dilute acetylene gas may be substituted for the arc, if they yield gases capable of being purified as herein described.

Reference is to be made to the accompanying drawing, in which the figure is a side elevation of preferred equipment for carrying out the process. In the drawing, reference numeral 1 denotes an arc oven for the conversion of natural gas, coke oven gas, cracked gases from oil refineries or similar material into acetylene. The gas is supplied through line 2. The construction and operation of the arc form no part of the present invention. The gases from the arc, containing usually between 5% and 25% of acetylene, are passed through a pipe 3 into a cooler 4 preferably in the form of a packed column. Water may be flowed downward through the tower from pipe 5 and discharged through pipe 6. The cooling is obtained by water of the usual feed water temperature.

The cooled gas, at atmospheric or somewhat higher pressure, passes through pipe 7 into a gas holder 8. From this it flows by pipe 9 into a compressor 10 which also receives recycled gas from a source to be described later. The compressor may be bypassed if desired through a line 11, controlled by valves 11a and 11b. In the normal operation of the process the gas flows through the compressor and is raised to a pressure of about 20 to 40 pounds per square inch, at which pressure it flows through a cooler 12, which reduces it to atmospheric temperature or thereabout, and thence through pipe 13 into the diacetylene scrubber 14. This is preferably a tower with baffles or other means to bring the gas into good contact with the scrubbing liquid which is introduced at the top through pipe 15.

The scrubbed gas passes through line 16, into which steam is also introduced through line 16a, into heat exchanger 17 and thence through line 18 into the catalyst chamber 19 for the conversion of the purified acetylene to acetaldehyde. The catalyst chamber is charged with any suitable form of catalyst such as metallic oxides. Any known or desirable way of converting the acetylene to acetaldehyde may be employed as this does not form in itself a part of the present invention. In line 18 there is inserted a bypass 20 controlled by valves 21 and 22. This bypass connects with a heater 23 which can be adjusted to bring the gas to the exact temperature required in the catalyst chamber when starting the equipment.

The gas from catalyst chamber 19, containing acetaldehyde equivalent to most of the acetylene entering the catalyst chamber, passes through a line 24 and heat exchanger 17, thence through line 25 into the cooler 26. This is a tubular apparatus using water as the cooling medium. The product from the cooler is either taken directly through line 28 to weak acetaldehyde storage tank 29 or is passed through line 30 into the lower part of a wash tower 31.

In the wash tower 31 the acetaldehyde-containing gas is brought into contact with water which flows in through pipe 32. The tower has the usual baffle plates, packing or the like. The amount of water is controlled so as to adequately dissolve the acetaldehyde without unduly diluting the product. The solution of acetaldehyde in water, together with any other liquid products formed in the reaction, passes through line 28a and line 28 from the bottom of tower 31 into the storage tank 29. From this tank a pump 33 forwards the liquid via line 34 through heat exchanger 35 and pipe 34a into the upper part of tower still 36. Heat exchanger 35 may be bypassed through line 37. Flow through this line and line 34 is controlled by valves 38 and 39 respectively.

The still is heated at the bottom by closed steam coil 40 or other suitable heating means, such as direct steam, and bell cap plates or the like are provided throughout the greater part of the height of the tower. The product collecting in the bottom is withdrawn through line 41 and flows in heat exchange with the acetaldehyde liquor passing through exchanger 35. The vapor coming off at the top of the tower still through line 42 is concentrated acetaldehyde. The mixture passes through the condenser coil 43 into reflux tank 44. A part of the liquid in this tank is sent by pump 45 to the upper part of tower 36 through line 46 to serve as reflux therein. The bulk of the product entering tank 44 runs through line 47 into the concentrated acetaldehyde storage tank 48. From this it may be withdrawn as desired through line 49 for conversion into acetic acid or other products.

Any gases uncondensed in coil 43 are separated in tank 44 and passed through line 50 into the vent line 51. Also any gases that may be liberated in tank 48 pass through line 52 into the vent line. This leads to a suitable washer 53 and thence through line 54 to gas holder 8 for reuse in the process.

In the foregoing the passage of the acetylene and its products has been described. Reference will now be made to the means for purifying the acetylene.

As indicated above the primary purification is obtained in the diacetylene scrubber 14 which receives a solvent liquid through line 15. This line is supplied from a tank 55. It is preferably charged with a hydrocarbon oil such as gas oil, or other solvents of diacetylene and impurities in the gas may be employed, for example, acetone, toluene, etc.

The oil charged with impurities is passed from the bottom of tower 14 through line 56 into the top of the acetylene stripper 57. In the form of equipment illustrated this is a compartment at the top of a tall tower 58 which serves for stripping out the diacetylene from the solvent oil. It will be understood, however, that separate towers or a plurality of separate towers may be used.

The pressure in acetylene stripper 57 is somewhat lower than in scrubber 14. The pressure may be dropped at valve 59 from the higher pressure to about 0–3 pounds per square inch gauge. The greater part of the acetylene dissolved in the solvent oil is removed by passing through the oil a countercurrent stream of gas from the wash tower 31. This gas flows through line 60 and enters stripper 57 just above the partition plate 61 which separates it from the lower tower section 58. The acetylene removed from the oil together with the spent gas flows through line 62 into compressor 10. Recycled gas may also enter at this point through line 54 connected as described with washer 53.

The oil freed from most of the acetylene but still containing diacetylene and other impurities passes through line 63 into the upper part of the lower section 58. The pressure in this section is about the same as in section 57, but if desired a differential pressure may be established using the control valves 59 and 59'. The impure oil flows down over the plates in section 58, meeting as it does so an ascending current of spent gas which is introduced via line 60 and branch line 64. A part of this spent gas may be diverted through line 65 to the gas holder 66. Valves 67 and 68 control flow through lines 64 and 60 respectively. The oil discharged from the bottom of tower 58 through line 70 is substantially pure and can be recycled directly to tower 14.

The gas from holder 66 is passed through line 71 into compressor 72 which forwards it either through line 73 to burners or for other use or through line 74 to the arc furnace 1. Valves 75 and 76 control flow through lines 73 and 74 respectively.

It will be observed that in the process described there is a direct passage from natural or cracked gas to acetaldehyde without any concentration of the acetylene. This greatly simplifies the process. It is further simplified by the use of the spent gas from the acetaldehyde wash tower to remove the acetylene and the impurities from the charged solvent oil. This gas comes from the high pressure scrubber 14 and is therefore under sufficient pressure to flow countercurrent to the oil in both sections 57 and 58. It is not intended to limit the invention to the use of this spent gas as the stripping agent as obviously other inert gases could be used. However, it is preferable to operate as described.

I have found that the impurities are removed by countercurrent flow of solvent oil or other solvent with the dilute acetylene gas. Heretofore various chemical means have been adopted to purify acetylene for conversion into acetaldehyde. The solvent oil may be used repeatedly after revivifying it as described. The two-stage removal of acetylene and diacetylene permits the recovery of the former for reuse in the process.

The system may be flushed out by introducing nitrogen or other suitable gas through line 71a. Flushing gas may be introduced also through line 77 and pump 78.

The following example is illustrative of a preferred method of operating: A gas obtained from the high pressure cracking of petroleum oil and containing 10% or more of olefins is passed through line 2 into the arc furnace 1. It is there converted into a mixture containing between 15% and 25% of acetylene associated with some diacetylene and other impurities. These are absorbed in scrubbing tower 14 operated at a pressure of 30–40 pounds per square inch and at atmospheric temperature. The purified acetylene is passed through line 16 to the catalyst chamber 19 and is thereafter treated as described for the preparation of acetaldehyde.

The solvent oil is stripped in section 57 by means of spent gas under a slight pressure and at atmospheric temperature for the removal of acetylene. A small part of the diacetylene may be removed simultaneously but this will do no harm in the recycling through the operation.

The oil containing the bulk of the diacetylene is freed from it by stripping with the spent gas in section 58 at a slight pressure and at atmospheric temperature. The purified oil is returned to scrubber 14 and the removed diacetylene and gases associated with it are disposed of as described. There is no objection to passing a certain amount of diacetylene through the arc furnace as it may in part be converted into acetylene, so that this does not result in building up a quantity of diacetylene in the circulating system. In any case it finally leaves the system through line 73 which prevents any serious increase in concentration.

Although the invention has been described as intended for the direct conversion of acetylene into acetaldehyde, it will be understood that the preliminary stages of purification are equally applicable if the acetylene is to be used for other chemical reactions. The purified acetylene may be used for the manufacture of butadiene and other compounds.

When it is desired to produce a high concentration of acetylene in the gas leaving the arc, it is desirable to start with a cracked gas resulting from the vapor phase cracking of petroleum hydrocarbons. Such gases may contain 50% or more by volume of olefins and diolefins. I have found that these compounds are converted very readily in the arc into acetylene.

For this reason we prefer to start with a gas which is in substantial part unsaturated, although of course the invention also includes the use of gases which are predominantly paraffin in character as the starting material. It is preferred to utilize countercurrent contacting of the gas and liquid in the towers provided with baffles, packing or the like. However, equivalent means may be adopted such as concurrent flow through mixing columns and the like.

The foregoing description is merely illustrative and various changes and alternative procedures may be adopted in the scope of the appended claims, in which it is my intention to claim all novelty inherent in the invention as broadly as the prior art permits.

I claim:

1. Process of purifying gases containing a substantial amount of acetylene and some impurities of the nature of diacetylene, which comprises contacting said gases with a solvent for said impurities, at a temperature low enough, under the pressure conditions used, to effect solution in said solvent of at least a major proportion of the impurities but high enough to effect solution of not more than a relatively small proportion of the acetylene.

2. Process according to claim 1, in which the solvent used is selected from the group consisting of gas oil, acetone, and toluene.

3. Process according to claim 1, in which the solvent used is a hydrocarbon oil.

4. Process of purifying gases containing a substantial amount of acetylene and some impurities of the nature of diacetylene, which comprises contacting said gases with a solvent for said impurities, at a temperature low enough, under the pressure conditions used, to effect solution in said solvent of at least a major proportion of impurities but high enough to effect solution of not more than a relatively small proportion of the acetylene, subsequently removing dissolved gases from the charged solvent, and recycling the solvent to the solvent contacting zone.

5. Process according to claim 4, carried out by stripping and recovering dissolved acetylene from the charged solvent, recycling said recovered acetylene to the solvent contacting zone and subjecting the solvent to a further stripping step to remove the impurities of the nature of diacetylene.

6. Process which comprises subjecting a gas containing hydrocarbons to a thermal decomposition under conditions producing a substantial quantity of acetylene and purifying the resultant gases by contacting same with a solvent for impurities of the nature of diacetylene, at a temperature low enough, under the pressure conditions used, to effect solution in said solvent of at least a major proportion of the impurities but high enough to effect solution of not more than a relatively small proportion of the acetylene.

7. Process which comprises passing a gas containing hydrocarbons through an electric arc to produce acetylene, cooling the hot gaseous mixture containing acetylene and impurities to about atmospheric temperature, contacting it with a solvent under superatmospheric pressure to dissolve a major proportion of the impurities but only a relatively small proportion of the acetylene, subsequently stripping the charged solvent first of acetylene and then of the diacetylene and other impurities, and finally recycling the solvent to the solvent contacting zone, also recycling the recovered acetylene to the solvent contacting zone and removing the impurities from the system.

8. Process of utilizing acetylene in the manufacture of organic compounds, which comprises purifying gases containing inert gases, a substantial amount of acetylene and a small amount of impurities of the nature of diacetylene by contacting them with a liquid solvent for said impurities, at a temperature low enough, under the pressure conditions used, to effect solution in said solvent of at least a major proportion of the impurities but high enough to effect solution of not more than a relatively small proportion of the acetylene, passing the purified gases containing acetylene and inert gases through a reaction zone, removing the reaction product formed and returning at least part of the residual gas to a stripping zone to remove dissolved gases from the charged solvent.

9. Process of making acetaldehyde from acetylene, which comprises contacting a gaseous mixture, containing a substantial amount of acetylene and a small amount of impurities of the nature of diacetylene and gases inert in the aldehyde conversion process, with a solvent, at a temperature low enough, under the pressure conditions used, to effect solution in said solvent of at least a major proportion of the impurities but high enough to effect solution of not more than a relatively small proportion of the acetylene, passing the purified gases to a conversion zone to produce acetaldehyde and recycling the residual gases from the aldehyde conversion process to a stripping zone to remove dissolved gases from the charged solvent.

10. The method of separating diacetylene from gas mixtures containing acetylene comprising washing the mixture with a quantity of a solvent, which is insufficient for dissolving the major portion of the acetylene present in the mixture, at a temperature above the temperature at which greater quantities of acetylene will go into solution.

11. The method of separating diacetylene from gas mixtures containing acetylene comprising washing the mixture with a quantity of a ketone, which is insufficient for dissolving the major portion of the acetylene present in the mixture, at a temperature above the temperature at which greater quantities of acetylene will go into solution.

12. The method of separating diacetylene from gas mixtures containing acetylene comprising washing the mixture with a quantity of acetone which is insufficient for dissolving the major portion of the acetylene present in the mixture, at a temperature above the temperature at which greater quantities of acetylene will go into solution.

13. A process for the separation from acetylene of other strongly unsaturated compounds contained in a gas issuing from a treatment in the electric arc of a vaporized hydrocarbon product which comprises washing said gas with a hydrocarbon liquid at substantially ordinary temperature and under a pressure ranging from ordinary pressure to that at which the acetylene is not substantially dissolved.

14. Process of purifying gases containing a substantial amount of acetylene and some impurities of the nature of diacetylene, which comprises contacting said gases with gas oil as a solvent for said impurities, at about atmospheric temperature, thereby effecting removal of at least a major proportion of the impurities but not more than a minor proportion of the acetylene.

15. Process of purifying gases containing a substantial amount of acetylene and some impurities of the nature of diacetylene, which comprises contacting said gases with gas oil as a solvent for said impurities, at a superatmospheric pressure between the approximate limits of 20 to 40 lbs. per sq. in. and at about atmospheric temperature, thereby effecting removal of at least a major proportion of the impurities but not more than a minor proportion of the acetylene.

EGER V. MURPHREE.